United States Patent Office 3,545,987
Patented Dec. 8, 1970

---

3,545,987
TRANSPARENT YTTRIA-BASED CERAMICS AND METHOD FOR PRODUCING SAME
Richard C. Anderson, Schenectady, N.Y., assignor to General Electric Company, a corporation of New York
Filed Sept. 28, 1966, Ser. No. 582,755
Int. Cl. C04b 33/00
U.S. Cl. 106—39  4 Claims

ABSTRACT OF THE DISCLOSURE

The manufacture of high density yttria-base polycrystalline ceramic bodies containing from about 2 to 15 mol percent of an oxide selected from the group consisting of $ThO_2$, $ZrO_2$, $HfO_2$ and combinations thereof is disclosed. These bodies are substantially transparent and exhibit an in-line transmission per millimeter thickness of not less than 10 percent of all radiant energy of all wavelengths in the range of about 0.25 micron to 8.0 microns and at least 60 percent transmission of some wavelength within the range.

---

Figure 1:
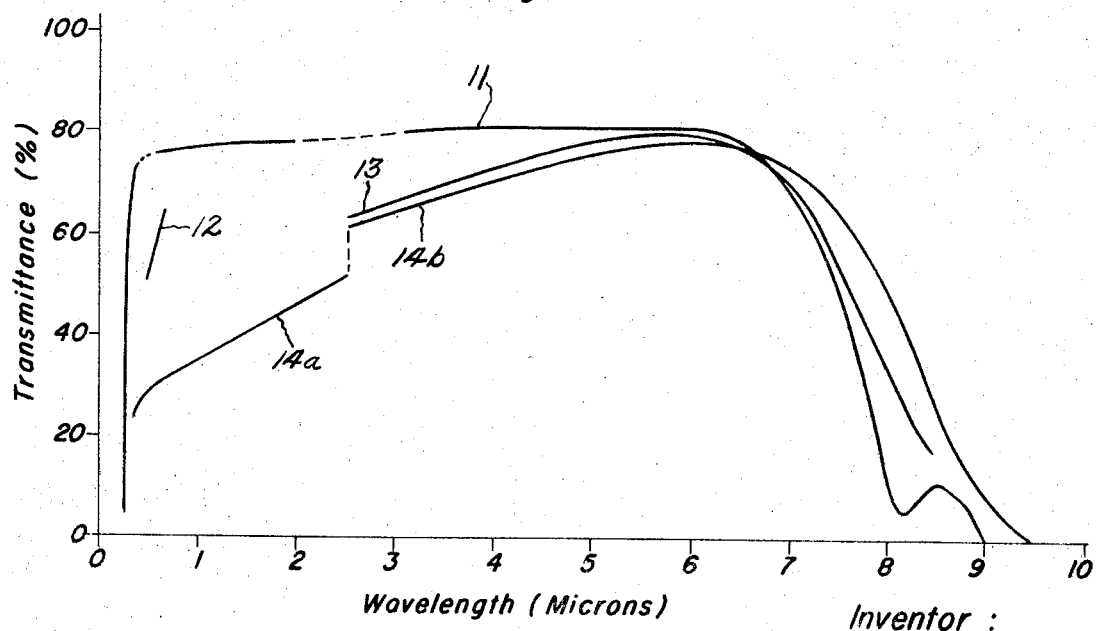

This invention relates to ceramic bodies and more particularly to high density yttria-base bodies containing thoria, zirconia, or hafnia or combination thereof, which are optically transparent and to a process for producing such bodies.

Ceramic materials are widely used in high temperature applications but with few exceptions the materials are completely opaque and cannot be used where light transmission is desired. There exist many situations in which a light transmitting ceramic would be of significant value, such as, for example, as windows for use in high temperature equipment. Further, it could be used for high temperature lamp envelopes and even as a lens material for optical equipment designed to be used at elevated temperatures. In the past, optical transparency in ceramics has been generally achieved through the development and use of single-crystal bodies, usually a time consuming, comparatively costly and physically limiting (due to size restrictions) way of accomplishing the purpose. Obtention of transparency in polycrystalline ceramic bodies would relieve many of the difficulties related to use of single crystal ceramic but many factors must be considered and overcome before any substantial degree of light transmission can be obtained in a polycrystalline body. For example, such things as the presence of a precipitate in the body causes light scattering and resultant low transmission. Similarly, pores trapped in the body during sintering to final density scatter light much like precipitates. Additionally, grain boundary cracks resulting from abnormal grain growth during firing act essentially as pores in their effect on transmissivity. All of the preceding problems, and others, must be properly overcome to obtain high density, transparent ceramic bodies.

A principal object of this invention is to provide a high density polycrystalline ceramic body having suffiicent transmissivity to provide for substantial in-line transmission of radiant energy therethrough.

An additional object of this invention is to provide a yttria-base ceramic body capable of in-line transmission permillimeter of body thickness of at least 10 percent of radiant energy of wavelength in the wavelength range from about 0.25 micron to 8 microns.

A further object of this invention is to provide a yttria-base ceramic body having added amounts of thoria, zirconia, or hafnia or combinations thereof, which is substantially transparent.

An additional object of this invention is to provide a process for producing the transparent ceramic bodies of this invention.

Further objects and advantages of this invention will be in part obvious and in part explained by reference to the accompanying specification and drawings.

In the drawings:
FIG. 1 is a curve showing the in-line transmission over the wavelength range from 0.2 to 9.0 microns of a yttria-base ceramic body of this invention.

Generally, the polycrystalline ceramic bodies of this invention are yttria-base ($Y_2O_3$) and contain additions of from about 2 to 15 mol percent of either thoria ($ThO_2$), zirconia ($ZrO_2$), or hafnia ($HfO_2$) or combinations thereof. These bodies are essentially of theoretical density, are polycrystalline of cubic crystallographic form, and are essentially transparent over a wide band of radiation wavelengths. Preferably, the bodies will contain from 8 to 10 mol percent thoria as the optimum composition. The process by which these bodies are produced comprises preparing the basic ingredients in the proper proportions, pressing the powdered oxide into green bodies and then firing or sintering the green bodies for a time sufficient to effect densification. Care must be taken during the sintering operation, which is normally carried out in hydrogen, that the operating conditions are such to insure that no reduction of the metal oxides occur or that any oxides which are reduced are given an opportunity to reoxidize. Failure to adequately control this important firing operation results in bodies of markedly inferior optical characteristics.

The base material for the composition is, as previously stated, yttrium oxide, $Y_2O_3$, and should be as pure as possible since the presence of any impurities could lead to defects in the final article of manufacture that would reduce its light transmitting characteristics. Lindsay $Y_2O_3$, Code 1116, a 99.99 percent pure micron size powder, has proven to be suitable in the manufacture of the ceramics of this invention. Thoria can be used either as a pure powder with particle sizes in the micron range or can be used as reagent grade thorium nitrate,

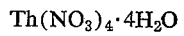

$$Th(NO_3)_4 \cdot 4H_2O$$

The particular material used is merely a matter of choice and not important to the overall process. Similarly, if zirconium oxide is to be the material added to the yttria, it can be added either as a particulate material or in the form of a pure recrystallized water-soluble salt such as $ZrOCl_2 \cdot 8H_2O$. Hafnium oxide would generally be added to the basic yttria as $HfOCl_2 \cdot 8H_2O$, as its the case with zirconia.

To make a transparent yttria body, a preselected quantity of yttrium oxide is measured out and then combined from about 2 to 15 mol percent thorium oxide, zirconium oxide, hafnium oxide or combinations thereof and these ingredients thoroughly mixed. Ceramics in the thorium-yttria system have generally been prepared by mixing $Th(NO_3)_4 \cdot 4H_2O + H_2O + Y_2O_3$ together in a suitable receptacle. Using about 1 cc. of $H_2O$ to 0.8 to 1.0 gram of total $ThO_2 + Y_2O_3$ gives the best results. Such a mixture sets or solidifies rapidly after about 5 to 10 minutes of agitation. It is thought that such a procedure allows for a very intimate physical mixing. The setting action allows the water to be driven from the batch in subsequent heating with a minimium in thorium salt migration and hence, batch segregation. Yttria forms a hydrated carbonate surface and nitrate salts have a strong hydration tendency.

Somewhat in contrast, compositions in the $ZrO_2$—$Y_2O_3$ system are most frequently prepared by mixing the respective powders in either water or alcohol and evaporating to dryness.

Following thorough mixing of the constituent powders, the material is pressed in dies or isostatically at 10,000 to 50,000 p.s.i. without the use of binders or lubricants. No unusual problems have been found in the compaction process, although die pressing laminations have sometimes been evident in samples pressed at 20,000 p.s.i. or above. Pressures of 10,000 p.s.i. are adequate for preparing samples of full density. Green densities in excess of 60 percent of theoretical have been measured prior to the final firing or sintering operation.

As was originally indicated, the firing or sintering operation is the last step in the production of transparent yttria-base bodies. Generally, temperatures will range between 2000 and 2200° C. during the densification of the green bodies. More specifically, sintering of the thoria, zirconia, or hafnia doped yttria-base ceramics is effected in a suitable furnace such as a molybdenum strip resistance heating furnace in a hydrogen atmosphere. The samples are raised to the sintering temperature at rates ranging between 20 and 200° C. per minute and at the end of the sintering process are cooled at a similar rate. Complete density is usually obtained by soaking at 2000° C. for one hour although various times at temperatures between 2000 and 2200° C. have been successful.

When the sintering operation is carried out in dry hydrogen, the ceramic is reduced and this condition is maintained on cooling unless steps are taken to assure that a partial pressure of oxygen is present in the furnace while the bodies are still at some temperature in excess of 1200° C. By exposing the heated material to the oxygen, reoxidation of any reduced metal oxide can be effected and transparency obtained. Sintering in vacuum also can result in at least partial reduction of the constituent oxides but the solution here is the same, specifically by reoxidation of the reduced oxides. Sintering in an oxygen containing atmosphere obviously precludes problems encountered by way of compound reduction.

The clarity or transparency of ceramic bodies according to this invention can be readily seen by referring to FIG. 1 of the drawings. Here a yttria-base body 10 containing 10 mol percent thoria is shown against an illustrative background and it is apparent that very good optical characteristics have been obtained in the body. This body which was about 1.66 mm. in thickness, was produced by pressing the mixed constituent powders at 10,000 p.s.i., the powders having been calcined following the initial preparation, as outlined earlier. The green body was sintered in a molybdenum strip resistance heated furnace in a hydrogen atmosphere to 2185° C. at a heating rate of about 30° per minute. It was held at 2185° C. for four hours and then cooled at a rate of 30° C. per minute. During the cooling back to room temperature, the body was subjected to oxygen while still above 1200° C. so that any reduced oxide could be reoxidized and thereby insure that transparency had been obtained.

FIG. 1 of the drawings illustrates the optical characteristics of several bodies of varying composition. The Curve 11 illustrates the percent transmittance through the body 10 illustrated in FIG. 1 at wavelengths ranging from about 0.25 up to 9.0 microns. It can be seen that the body transmits in excess of 10 percent of all radiant energy of all wavelengths in the range from about 0.25 micron to 8.0 microns and at least 60 percent of in-line transmission of some wavelength within that range. The transmission data up to about 2.5 microns was obtained on a DK2A Beckman ratio recording spectrophotometer and the data from 2.5 microns up to 9.0 microns were taken on a Perkin-Elmer Corporation infrared photometer, Model No. 521.

Curves 12, 13, 14a and 14b represent the transmission characteristics of bodies of different compositions also produced according to the process of this invention. The transmission characteristics indicated by Curves 12 and 14a were taken with the Beckman instrument just referred to and the data for Curves 13 and 14b were taken with the Perkin-Elmer Corporation instrument, also just mentioned. The material used to obtain the results indicated by Curve 12 was composed of 7 mol percent thoria, balance substantially all yttria and the transmission data was taken only for the visible range. The composition of Curve 13 was 6 mol percent zirconia, balance substantially all yttria and the material of the sample used to obtain Curves 14a and 14b was 10 percent thoria, balance substantially all yttria. The following table indicates the radiant energy transmitting properties of these bodies, all of which were produced according to the process outlined previously in the specification.

TABLE I.—PERCENT INLINE TRANSMISSIVITY

| Compsition, M/O | Wavelength, microns | | | | | | | | |
|---|---|---|---|---|---|---|---|---|---|
| | 0.25 | 0.50 | 1.0 | 2.0 | 3.0 | 4.0 | 5.0 | 6.0 | 7.0 | 8.0 |
| 90 $Y_2O_3$—10Th$O_2$ | 68 | 70 | 74.5 | 77 | ---- | 82 | 83 | 83 | 72 | 50 |
| 93 $Y_2O_3$—7Th$O_2$ | 50 | 60 | | | | | | | | |
| 90 $Y_2O_3$—10Th$O_2$ | | 28 | 35 | 47 | 64 | 68 | 72 | 78 | 68 | 48 |
| 94 $Y_2O_3$—6Zr$O_2$ | | | | | | 66 | 70 | 73 | 80 | 70 | 37 |

What I claim as new and desire to secure by Letters Patent of the United States is:

1. As an article of manufacture, a substantially transparent high density polycrystalline yttria-base body consisting essentially of yttria and containing from about 2 to 15 mol percent of an oxide selected from the group consisting of $ThO_2$, $ZrO_2$, $HfO_2$ and combinations thereof, said body having an in-line transmission per millimeter thickness of not less than 10 percent of all radiant energy of all wavelengths in the wavelength range from about 0.25 micron to 8.0 microns and at least 60 percent of in-line transmission of some wavelength within the wavelength range.

2. An article as defined in claim 1 wherein said body has in-line transmission of not less than about 60 percent of all radiant energy within the wavelength range of from about 0.3 micron to 7.3 microns per millimeter thickness.

3. An article as defined in claim 1 wherein said body consists essentially of from about 8 to 10 mol percent $ThO_2$, balance substantially all yttria.

4. An article as defined in claim 1 wherein said body consists essentially of from about 5 to 12 mol percent $ZrO_2$, balance substantially all yttria.

References Cited

UNITED STATES PATENTS

| 3,026,210 | 3/1962 | Coble | 106—39 |
| 3,141,782 | 7/1964 | Livey et al. | 106—55 |
| 3,278,454 | 10/1966 | Turner et al. | 106—57X |
| 3,311,482 | 3/1967 | Klingler et al. | 106—39X |
| 3,363,134 | 1/1968 | Johnson | 313—221 |
| 3,377,176 | 4/1968 | Wolkodoff et al. | 106—46 |
| 3,432,314 | 3/1969 | Mazdiyasni et al. | 106—57 |

OTHER REFERENCES

Curtis, C. E., Properties of Yttrian Oxide Ceramics, in J. Amer. Cer. Soc., 40, 1957, pp. 274–278.

HELEN M. McCARTHY, Primary Examiner

W. R. SATTERFIELD, Assistant Examiner

U.S. Cl. X.R.

23—21; 252—301.4; 313—221